United States Patent
Rajamani et al.

(10) Patent No.: US 9,760,658 B2
(45) Date of Patent: Sep. 12, 2017

(54) MEMORY-MAPPED OBJECTS

(75) Inventors: Kumar Rajamani, San Ramon, CA (US); Hochak Hung, Foster City, CA (US); Jaebock Lee, Sunnyvale, CA (US); Philip Yam, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 923 days.

(21) Appl. No.: 12/576,140

(22) Filed: Oct. 8, 2009

(65) Prior Publication Data

US 2011/0087642 A1 Apr. 14, 2011

(51) Int. Cl.
*G06F 17/30* (2006.01)

(52) U.S. Cl.
CPC .. *G06F 17/30997* (2013.01); *G06F 17/30557* (2013.01); *G06F 17/30589* (2013.01)

(58) Field of Classification Search
CPC ................................................. G06F 17/30589
USPC ................................................... 707/713, 718
See application file for complete search history.

(56) References Cited

U.S. PATENT DOCUMENTS

| | | | |
|---|---|---|---|
| 5,897,634 A * | 4/1999 | Attaluri et al. | |
| 6,219,770 B1 | 4/2001 | Landau | |
| 6,654,029 B1 * | 11/2003 | Chiu et al. | 715/717 |
| 7,409,694 B2 | 8/2008 | Forin et al. | |
| 2002/0078119 A1 * | 6/2002 | Brenner et al. | 709/102 |
| 2004/0162841 A1 * | 8/2004 | Bernstein et al. | 707/100 |
| 2004/0252134 A1 * | 12/2004 | Bhatt et al. | 345/619 |
| 2005/0240570 A1 * | 10/2005 | Ozbutun | 707/3 |
| 2007/0226685 A1 * | 9/2007 | Kaakani et al. | 717/108 |
| 2007/0233970 A1 * | 10/2007 | Saha et al. | 711/152 |
| 2008/0098046 A1 | 4/2008 | Alpern et al. | |
| 2011/0072006 A1 * | 3/2011 | Yu et al. | 707/718 |
| 2011/0191544 A1 * | 8/2011 | Naga et al. | 711/133 |

* cited by examiner

*Primary Examiner* — Grace Park
(74) *Attorney, Agent, or Firm* — Hickman Palermo Becker Bingham LLP

(57) ABSTRACT

A method and apparatus for efficiently managing cached objects is provided. A mapping is a typed relationship between cached objects. A base object contains content, and a mapped object is mapped to a base object when there is a particular relationship between the mapped object and the base object. The type of mapping defines how the objects in the relationship are treated when the mapped object is created, read, or written. At creation time, the mapping type may define how the mapping relationship is recognized. Sometimes recognizing a relationship requires establishing equivalence between the objects. At read and write time, the mapping type may define on which object a mutual exclusion lock is held, which content is returned or which object's content is updated. A wide range of applications can benefit from enhanced object caching performance, and in addition, application may define application-specific semantics on mapping types as well.

26 Claims, 9 Drawing Sheets

Query A:   Select empno from emp   510

Query B:   SELECT     empno FROM emp   520

Query C:   Select empname from emp   530

User Joe issuing

Query D: Select empno, empname from emp  540

Query E: Select empname, empno from emp  550

User Jane issuing

Query F: Select empname, empno from emp  560

MEMORY-MAPPED OBJECTS

FIELD OF THE INVENTION

The present invention relates to efficient cache management using memory-mapped objects.

BACKGROUND

Within the context of computer systems, a cache is used for temporarily storing data so that the data can be accessed more quickly and/or efficiently than is possible in the memory in which the data normally resides. Thus, volatile memory is used to cache data that resides on non-volatile memory, such as magnetic disks. Similarly, fast volatile memory is used to cache data that resides in slower volatile memory.

In an object system, the data is stored and managed as objects. The objects may be shared across multiple concurrent threads within a single process or across multiple processes. Thus provisions must be made for concurrency control. Shared read locks allow multiple execution threads to read the same object and prevent changes to the object content while the content is being read by another execution thread. An exclusive write lock provides non-shared access to the object while the content of the object is being updated.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
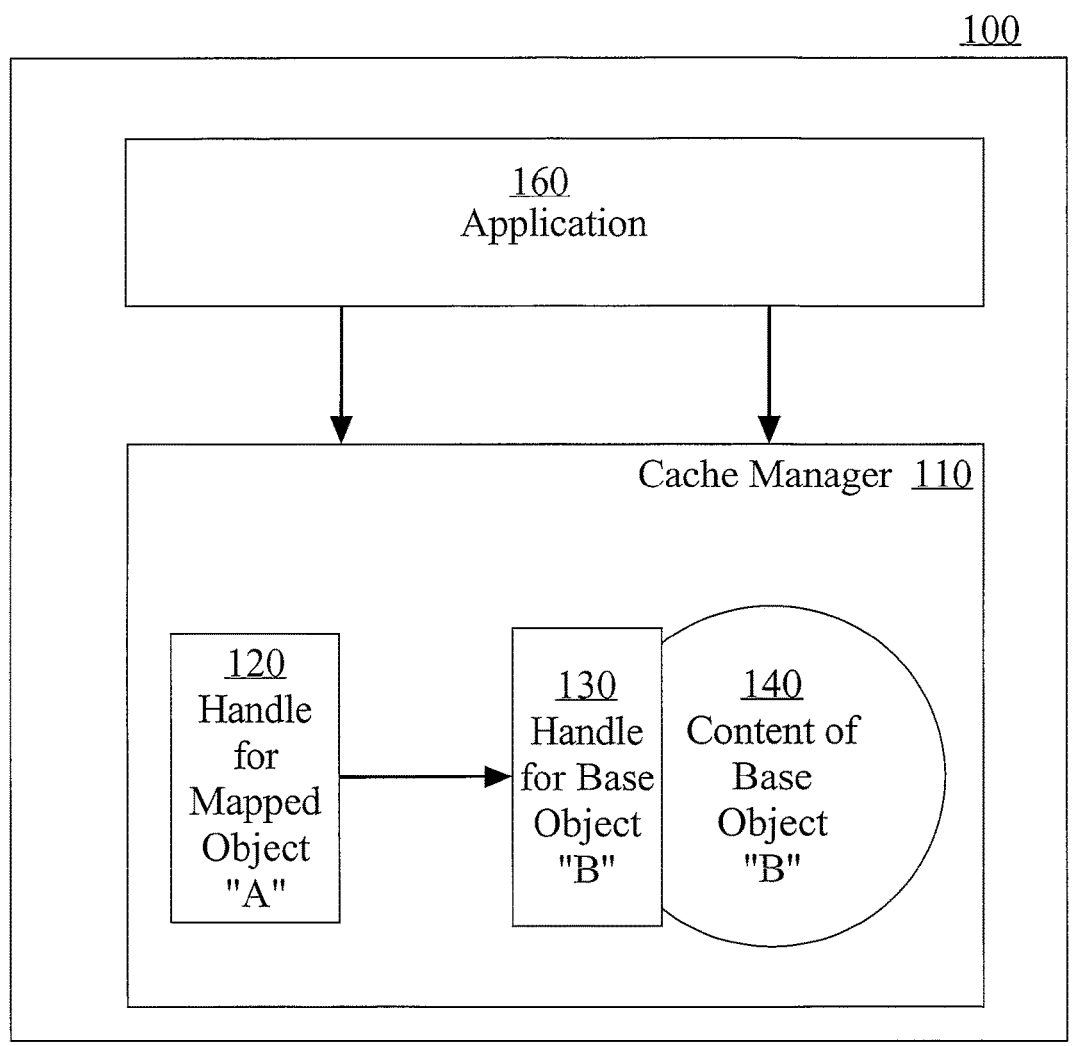
FIG. 1 is a block diagram showing elements of the system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The approaches and techniques described herein are directed to efficiently managing objects in a volatile memory cache. Relationships may exist among objects stored in the cache. The approach includes creating a relationship called a "mapping" between two objects, where the mapping only exists while the objects reside in the cache. The relationships are directional in that one object, called the "base object," has content associated with it, and the other object, the "mapped object," maps to the base object. There may or may not be object content stored directly in association with a mapped object.

Different relationship types may be recognized. A mapping type is associated with the mapping. When relationships exist between objects stored in a cache, knowledge of the type of relationship between the objects may be used to enable applications to use the cache more efficiently. For example, one particular relationship allows for many objects to be mapped to a common base object in the cache for shared reading, but when an exclusive write lock is obtained on a particular mapped object, a new base object is created and updated in association with that particular mapped object. In this example, the relationship between the mapped object and the base object provides for copy-on-write semantics that allows delaying the allocation of memory and processing associated with creating a new copy until an updated copy is actually needed.

As mentioned earlier, a mapping is a typed relationship between a mapped object and a base object. When a new object is created in the cache, a handle is created in association to represent the new object. In object-oriented systems in general, a handle is an opaque, indirect reference to a region of memory that is managed by the object system. A handle may be used by a program that is not part of the object system to specify operations to be performed on the object. When used in the context of the object system, the word handle refers to the memory that is referenced by the handle. When discussed from the perspective of the program using the object, handle refers to the object reference.

In addition to storing an object identifier, such as its name, the handle may contain other metadata for the object such as a mapping to another object, a mapping type, and a list of other objects that map to the object. Rather than storing links to other objects within the object contents, the mappings and mapping types are stored in the object handle. The type of mapping determines the semantics of various operations on the objects, and thus the behavior (i.e. sequence of operations) performed on the objects in the mapping. The types of behavior that depend on the mapping type include which object content is returned when reading a mapped object, which object content is written when writing a mapped object, which objects are notified when a base object's content is updated, the locking protocol (which handles are locked for read and write operations), and the rules for recognizing object equivalence.

In one embodiment, the volatile memory cache is used to store database metadata for underlying database objects such as schemas, tables, views, and cursors.

FIG. 1 depicts the components of the system described herein. A computer (100) runs software components such as Cache Manager (110). The Cache Manager (110) manages the contents of the cache of objects stored in the computer's volatile memory. When a request is made for Object B, if Object B is not already in the cache, the content of Object B is loaded into a base object (140) and a handle is created to represent the object (130). Later, a process can request that a new Object A be mapped to Object B. In response, a handle representing Object A (120) is created, and the handle maintains the mapping information from Object A to Object B Object A may or may not have its own content. Object A does not have its own content as depicted in FIG. 1.

Figure 2:
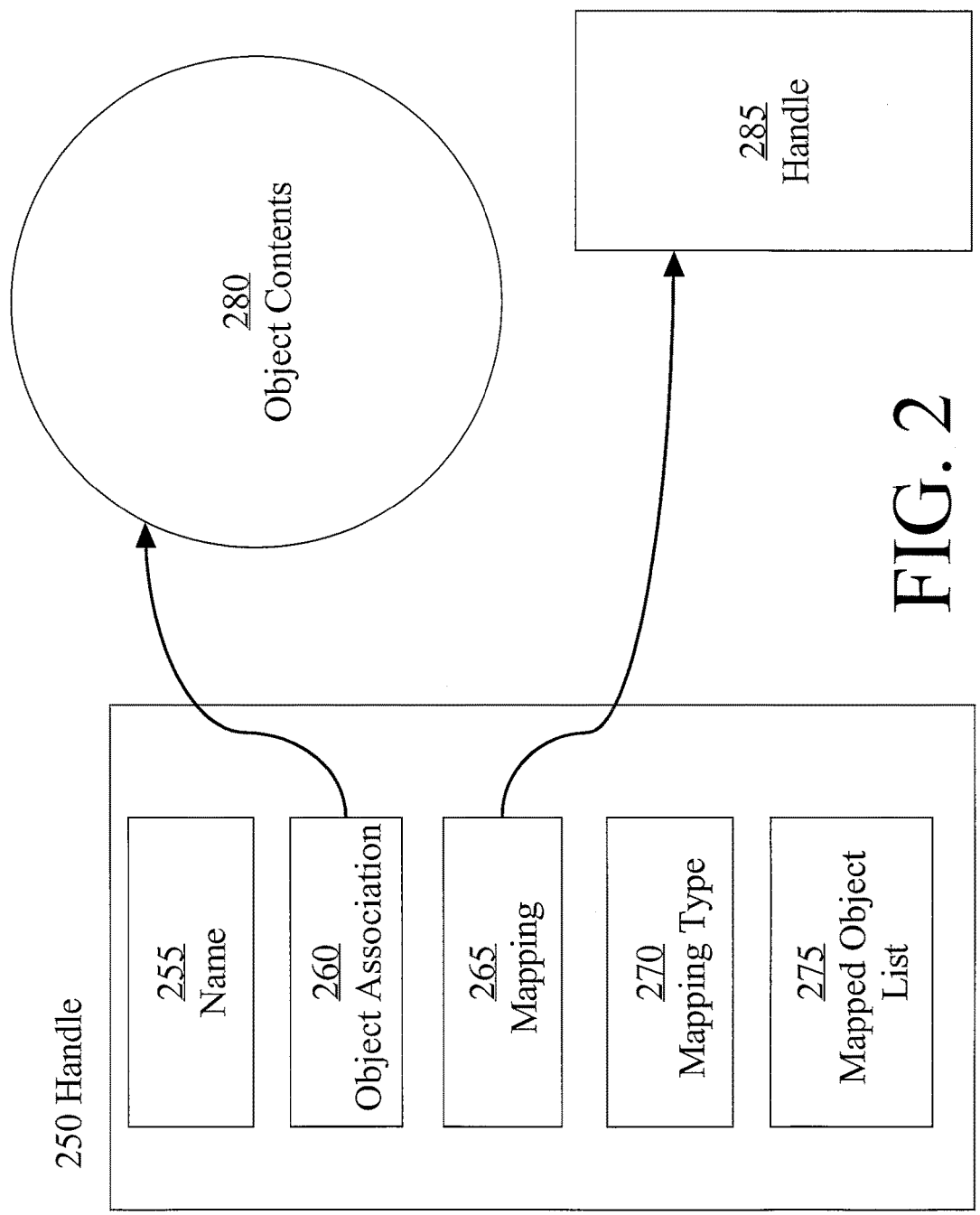
FIG. 2 shows attributes of an object handle for an embodiment of the invention.

FIG. 2 shows more detail about the information maintained within an object handle (250). Name (255) contains the name of the object. Object Association (260) records the association between the handle and the Object Contents (280) (if the object is a base object). Mapping (265) is a link to another handle if Handle (250) represents a mapped object. If Mapping (265) does not contain a link to another handle, then Handle (250) represents a base object. However, a base object may also be a mapped object, and thus, some base objects have Mapping (265) populated with a link to another base object.

As shown in FIG. 2, Mapping (265) is linked to Handle (285). Thus, Handle (250) represents a mapped object. Mapping Type (270) is the type of mapping that, as mentioned above, defines the semantics of operations performed on the mapped object. The handle for a base object may or may not have the mapping type specified. Mapped Object List (275) is a list of all the objects that map to the object. In other words, all the handles that contain links to Handle (250) can be found in the Mapped Object List (275).

A base object has object content. Content can be any information that can be stored in volatile memory. Examples of content that may comprise a base object are a file, a data structure, a database result set, a database query, etc. A mapped object may also have content, but is not required to.

In the next sections, various mapping types are described along with their operational semantics.

Mapping Types and Semantics

As mentioned above, there are a variety of possible relationships between cached objects that may be represented in the mapping between the objects. The relationship is stored in the mapping type of the object handle. The relationship types include: non-versionable, versionable, representative, dependency, syntactic, and semantic. Multiple mapping types may share similar semantics. Additional relationships may also be defined.

Figure 3A:
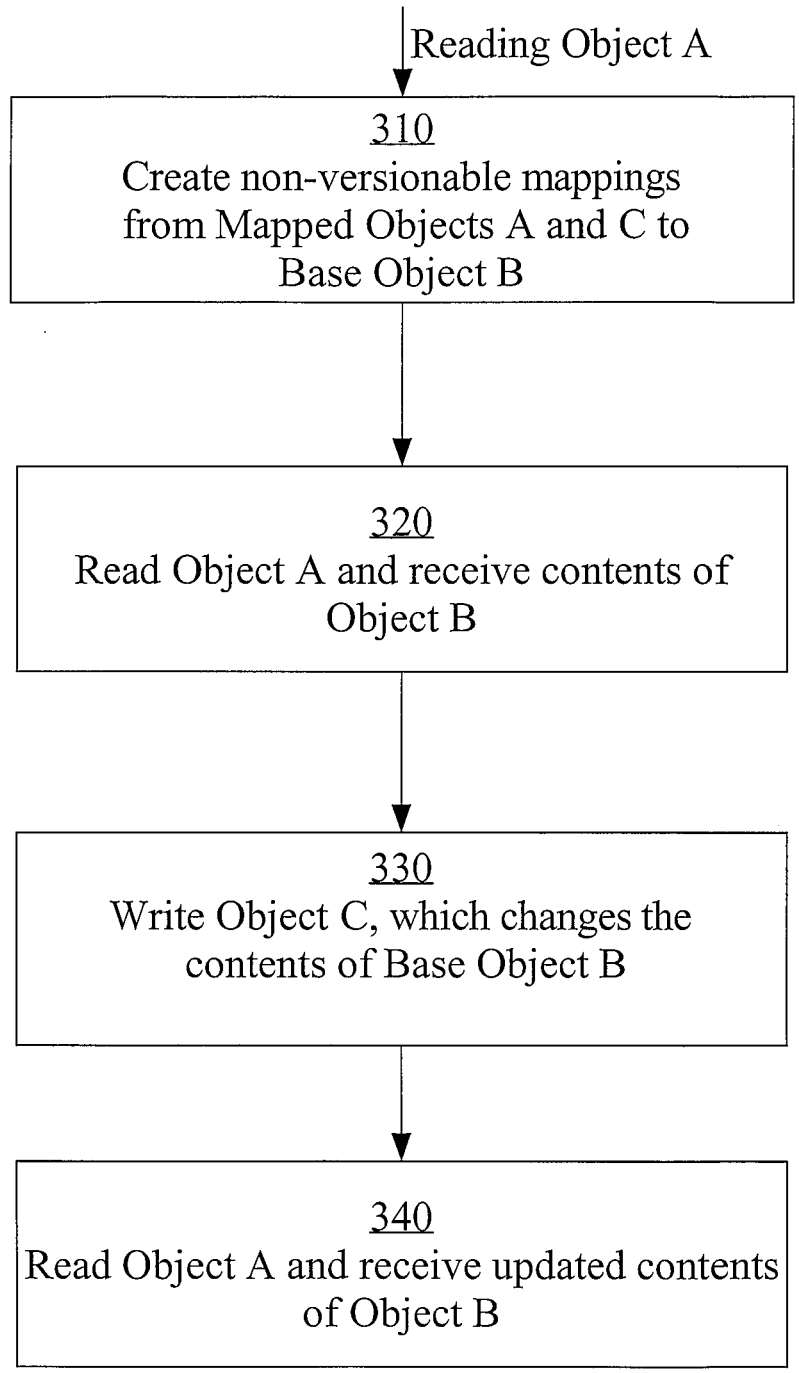
FIG. 3A is a flow diagram showing the semantics of writing through a mapped object with a non-versionable mapping to a base object for an embodiment of the invention.

A non-versionable relationship is one in which a mapped object shares the contents of a base object such that writing the mapped object updates the contents of the base object. FIG. 3A shows an example flow for updating the content of a mapped object in a non-versionable mapping to a base object. Step 310 shows creating non-versionable mappings from Object A to Object B and from Object C to Object B. Step 320 shows reading from Object A and retrieving the contents of Object B Step 330 shows updating Object C, resulting in changing the contents of Object B. In Step 340, reading Object A retrieves the updated contents of Object B. The semantics of a write operation for a non-versionable mapping type is that exclusive write locks are obtained not only the object being explicitly written, but also an exclusive lock is automatically obtained on the base object that will be updated as a result of the write operation.

Figure 3B:
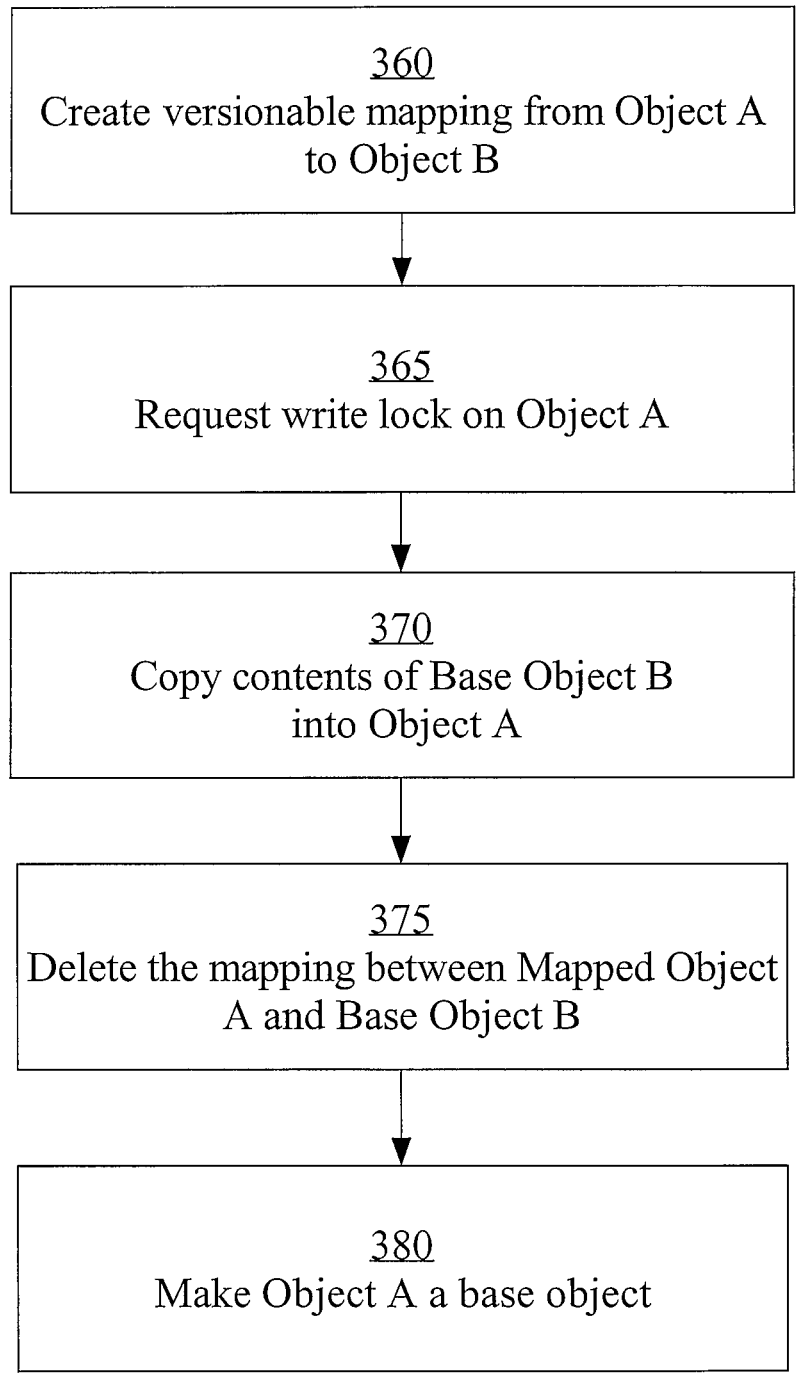
FIG. 3B is a flow diagram showing the semantics of writing through a mapped object with a versionable mapping to a base object for an embodiment of the invention.

A versionable relationship provides for copy-on-write semantics. FIG. 3B is a flow diagram that shows the operational behavior of reading from and writing to a mapped object in a versionable mapping. In Step 360, a versionable mapping is created from Object A to Object B. In Step 365, a write lock is requested on Object A. In Step 370, the content of Object B is copied into the content of Object A. In Step 375, the mapping between Object A and Object B is deleted and each object has its own content. In Step 360, Object A becomes a base object independent of Object B. When a write request is received for updating A, an exclusive write lock is obtained on A, but a shared read lock is obtained on Object B. Thus, other objects with versionable mappings to Object B may continue to access Object B's content while Object B's content is copied into Object A, and thus, other mappings to Object B are not blocked or disturbed by writing through a versionable mapping to Object B.

Figure 4:
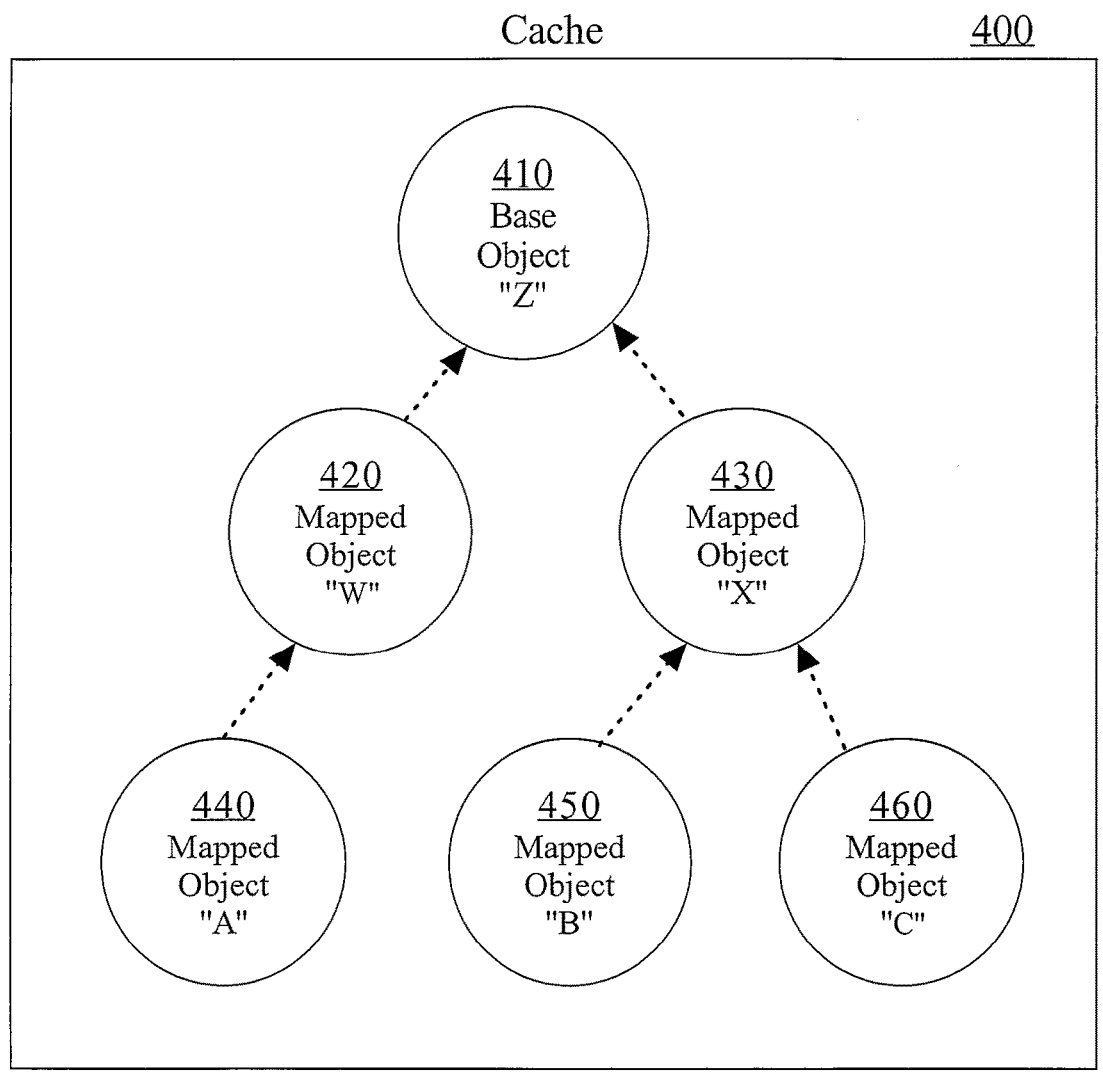
FIG. 4 shows an example of an inheritance hierarchy comprising inheritance mapping relationships among base and mapped objects.

A representative relationship may be used in a hierarchy of objects where the root of a hierarchy is a base object, and child nodes in the hierarchy are objects mapped to the base object. The base object represents the children mapped objects. FIG. 4 shows an object hierarchy. Performing an operation on a base object in an object hierarchy causes the operation or the effect of the operation to propagate recursively through the hierarchy that is rooted at the base object. An example of a representative relationship might be objects that represent a hierarchy of locks. Obtaining a lock on Mapped Object "X" (430) ("X") would have the effect of locking Objects B (450) and C (460). In one embodiment, the locking operation may be performed recursively at every node in the subtree. In another embodiment, all nodes in the hierarchy rooted at the locked node are implicitly locked because the locking protocol requires obtaining a lock on the base object before a mapped object may be locked.

A dependency relationship type represents that one object relies on another object. In one embodiment, one object relies on the existence of anther object in the cache. For example, an implicit dependency relationship exists between all mapped objects and their associated base objects. A base object continues to reside in the cache as long as there is at least one object that is mapped to the base object. Another example of a dependency relationship is a mapping between a cursor and the schema of the table accessed by the cursor. If the schema of the table changes, a cursor object depending on the associated schema object might need to be recomputed. When the contents of a base object are updated, the list of objects that are mapped to the base object can be traversed to identify the objects for which it is necessary to perform operations in response to the base object content update.

A syntactic relationship is one in which the name of the mapped object may be rewritten by a set of rules to match the content of a base object. Thus, there is a syntactic equivalence relationship that allows the mapped object to share the content of the base object. One example of the use of a syntactic relationship is when the name of a cached object is an expression, and the content of the base object results from evaluating a function on the object name. In one embodiment the function is a direct computation of the expression. In another embodiment, the expression may be an SQL query. A database manager performs analysis, optimization, and translation on a query, and the results of this time-consuming computation may be stored as the contents of a base object. The phrase "evaluating the expression" is intended to mean evaluating whatever function is associated with the object type.

Syntactic mappings are created when an object being placed in the cache is discovered to be syntactically equivalent to another object already in the cache. Thus, the first object placed in the cache becomes a base object. Subsequent objects placed in the cache are evaluated to determine whether a syntactically equivalent object is already in the cache. Syntactic equivalence is determined by running transformations on the name of the newly cached object and the names of the set of cached objects of the same object type to determine if there is a syntactic match. The mapping manager may call an application-provided function that performs the analysis. In that way, each application may utilize application-specific transformation rules for what syntactic equivalence means. In one embodiment, syntactic relationships are non-versionable mappings. In an alternate embodiment, syntactic relationships are versionable mappings.

Figures 5A, 5B:
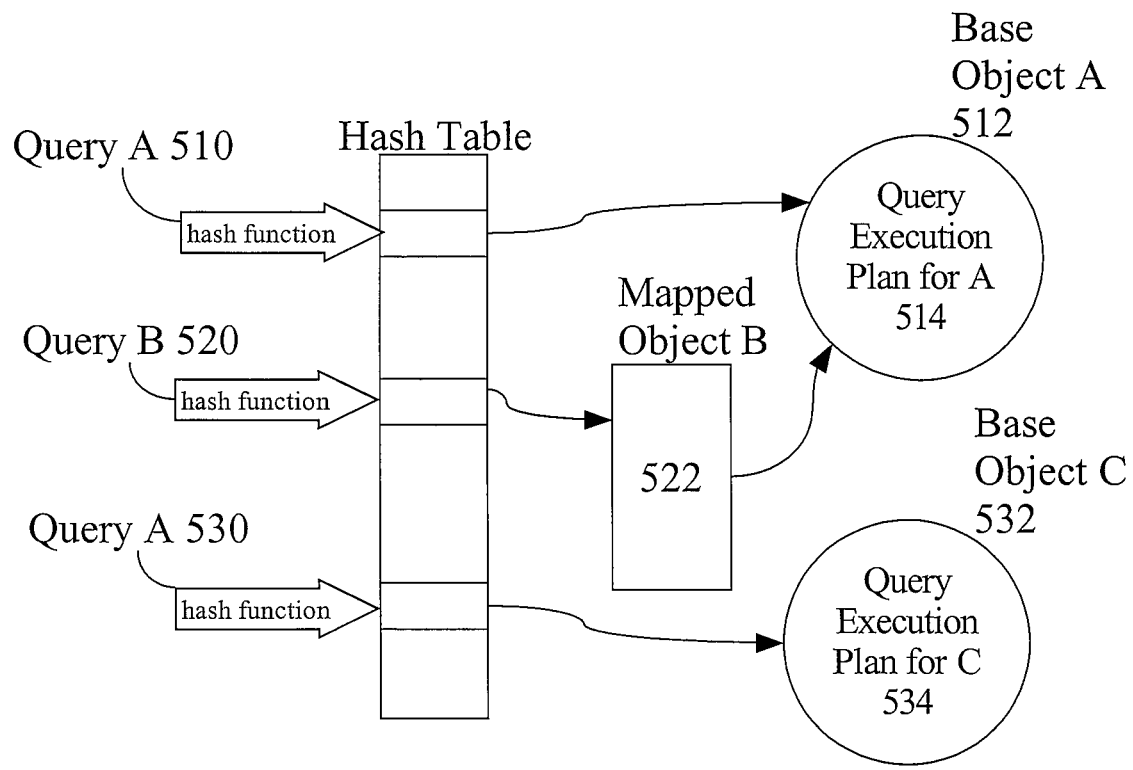
FIG. 5A shows an example of a syntactic mapping relationship.
FIG. 5B is a diagram showing the effect of evaluating the queries in the example in FIG. 5A for an embodiment of the invention.

FIG. 5A shows a set of example database queries, and FIG. 5B shows the relationships among the objects created when evaluating these queries. The same user issues Queries A (510), B (520), and C (530) in sequence. A base object (512) is created to represent Query A. The query expression itself is hashed, and the key returned from the hashing function identifies a corresponding base object (In this example, Object A is the base object). The content of Object A is the Query Execution Plan (514) for the optimized and rewritten query expression for Query A (510). Next, Query B (520) is received. Query B is hashed to determine whether there is already an object in the cache whose associated execution plan may be reused. No equivalent object will be found until the application is called to determine whether Query B is syntactically equivalent to Query A. The application may apply a set of transformations that includes stripping white space and ignoring differences in case insensitive keywords to determine that Query A (510) and Query B (520) are syntactically equivalent. As a result of the determination, a mapped object (522), Object B, is created for Query B (520) and mapped to Object A (512). Thus, the content of Object A may be used as the query execution plan associated with mapped Object B (522) without having to re-compute the equivalent query. When Query C (530) is received, the registered set of transformations may determine that there is no possible syntactic re-writing of Query C that makes the name of Query C equivalent to an object already in the cache. Thus, a new base object (532) is created to represent Query C (530). A distinct query execution plan (534) comprises the content of Object C (532).

A semantic relationship is similar to a syntactic relationship in that it is useful when objects represent an expression and the base object contents comprise the evaluation of the expression. However, a semantic relationship requires only that the results of the evaluation be the same, not that the expression be syntactically equivalent. That is, simple rewriting rules like removing white space or ignoring differences in capitalization cannot reconcile the differences between two expressions presented by cached objects. However, the expressions of the mapped and base objects must have the same meaning such that the evaluation of each yields the same results.

Two database queries may be semantically different even if the queries are syntactically identical. For example, a schema is associated with each database user that defines the set of database objects, such as table names, that the user will use. The same table name may appear in multiple users' schemas and yet refer to two different database tables. Thus, if two users issue a query, each using the same table name, each query might actually be reading from different tables. Thus, the queries might look identical but request different behavior.

Figures 5C, 5D:
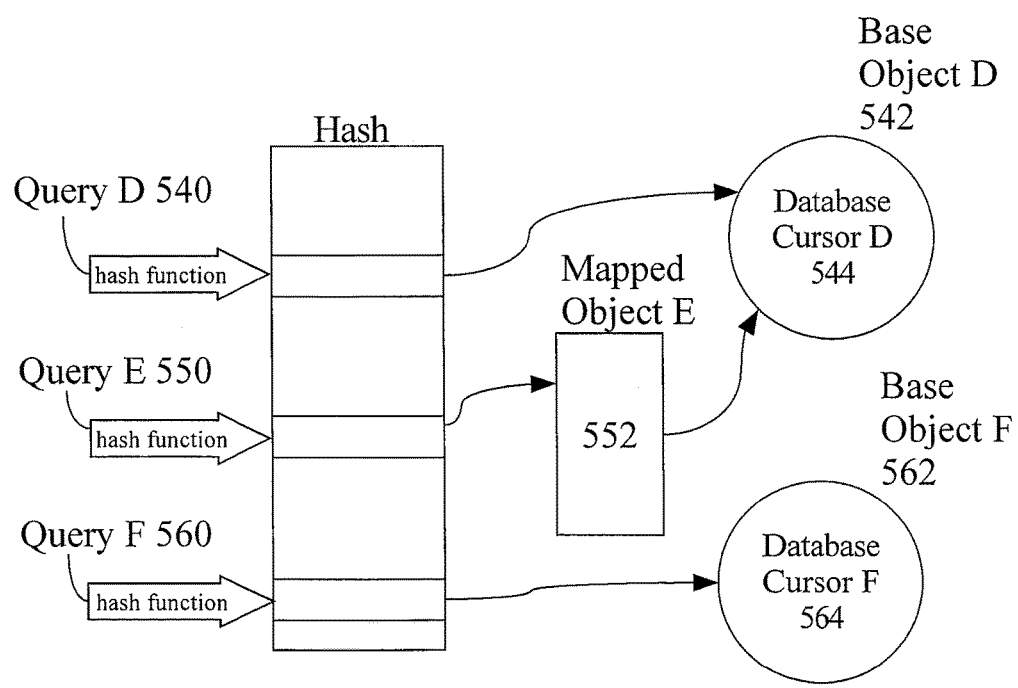
FIG. 5C shows an example of a semantic mapping relationship.
FIG. 5D is a diagram showing the effect of performing the queries in the example in FIG. 5C for an embodiment of the invention.

FIG. 5C and 5D show an example to explain semantic relationships where the cached objects represent database query expressions. User Joe issues Query D (540) that requests a set of rows from an employee table with columns for the employee number and employee name. As the first query to be received, a base object, Object D (542), is created to represent Query D (540), the query expression is hashed to identify Object D (542), and the contents of Object D (542) is the database Cursor (544) returned when the query is executed at run time. When Joe issues Query E (550), a set of rules determines that the difference in the query is the order of the columns in the output, but the same return results could be shared between Queries D (540) and E (550). As a result, a mapped object, Object E (552), is created to represent Query E (550) and is semantically mapped to Object D (540). When Query E (550) is run, the results can be reused from Query D (540).

Next, user Jane issues Query F (560). Jane also reads from table emp, but Jane's table emp is a different database table from Joe's table emp. Although syntactically identical to Joe's Query E (550), Jane's Query F (560) is semantically different from either of Joe's queries. Thus, a new base object, Object F (562), is created to represent Jane's Query F (560). A distinct database cursor comprises the contents of Object F (564).

Figure 6:
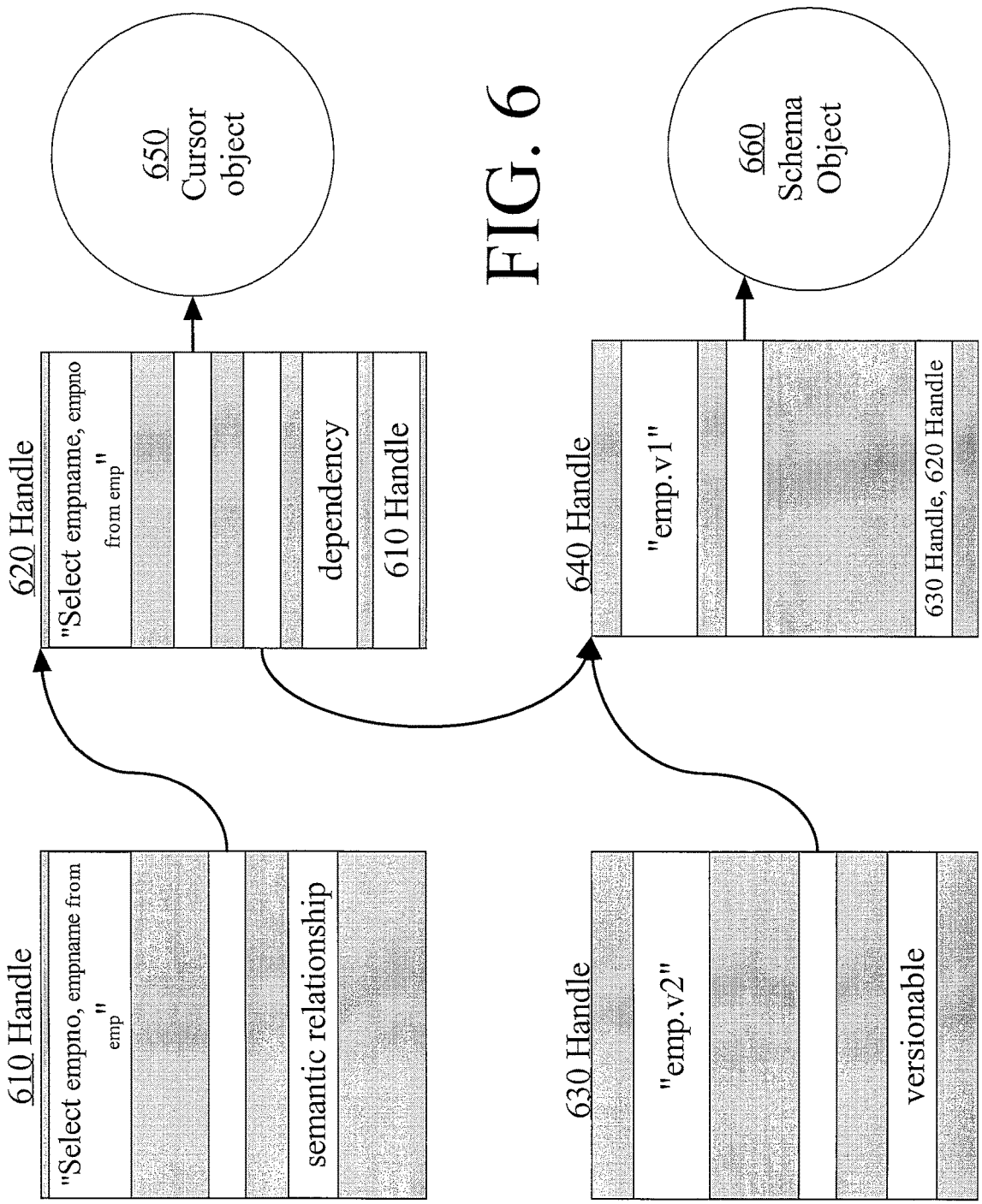
FIG. 6 shows an example of a network of cached objects having a variety of mapping types for an embodiment of the invention.

FIG. 6 shows an example of four cached objects and their mappings. Handles (610) and (630) have no object content directly associated with the handles, and Handles (620) and (640) have object content. Handle (610) represents a semantic mapping between the database query (shown in the name field of the handle) and Handle (620). Handle (610) is semantically related to Handle (620) because the name of the base object has been determined to be semantically equivalent to the name of the mapped object of Handle (610). Thus, reading through Handle (610) retrieves the content of cursor object (650) that is associated with Handle (620). Handle (620) is a base object for Handle (610) and also a mapped object to Handle (640). The content of cursor object (650) depends on the version of the schema represented by Handle (640). The dependency relationship indicates that when a change occurs to the contents of the schema object (660), some operation might need to be performed on Handle (620) (e.g., the cursor object may need to be recomputed). Handle (620) contains Handle (610) in its list of objects that are mapped to Handle (620). Handle (630) represents a newer version of the schema. Handle (630) might be created by a patch process that is expecting to update a copy of the schema object only for its own purposes, and does not want the running system using Handles (620) and (640) to be affected by the changes. Handle (630) is versionable because when the schema object is updated, a copy of the schema contents will become associated with Handle (630). Until Handle (630) is used for a write operation, reads through Handle (630) will return the content of schema object (660). Handle (640) is a base object that is mapped to by both the cursor object Handle (620) and new version Handle (630). The mapped object list contains both of these handles.

Mappings are Dynamic and Transient

A mapping manager maintains the mapping information stored within the object handle. When an object is created as a mapped object, a mapping is created of the specified type. The mapping type may change over the life of the object. It is not necessary to delete and recreate the object or the object handle to change the mapping type. For example, the mapping of Object A to Object B may originally be a versionable mapping and later may be changed to non-versionable mapping without affecting the contents of Object A or Object B or their status as cached objects.

Certain events in the system will cause a mapping to become deleted. As already described, when a mapped object having a versionable relationship with a base object is written, the mapped object becomes a base object, and the mapping is deleted. However, there are other events that cause a mapping to be deleted. A mapping only exists as long as the corresponding objects reside in the cache. When the mapped object of the mapping relationship ages out of the cache or is itself deleted, then the handle that represents the object, and thus the mapping contained in the handle, is also deleted. Also, the mapping manager may respond to a direct request to delete a mapping. A particular base object may continue to reside in the cache for as long as there are other objects in the cache that are mapped to the particular base object. When all mappings to a base object have been removed from the cache, then the base object may also be removed from the cache.

The semantics of the mapping relationships described herein are very different from other object-to-object links in use. For example, symbolic and hard links used to map one persistent file to another are different from the approach described herein in that the links themselves are persistent rather than transient. Once created, a file system symbolic link cannot be changed to a hard link or vice versa without deleting and recreating the link. In addition, when opening a file using a symbolic link, the target file is locked, not the link itself.

The mapping relationships described herein are also different from in-memory pointers or object references supported by programming languages. For example, few if any programming languages have typed pointers. A pointer may be defined based on what kind of object the pointer points to, but the pointer itself (analogous to the mapping) is not typed. Even if a pointer were typed, the type is not mutable. Casting may treat the object referenced through a pointer as a different type, but casting does not change the type of the relationship between the pointer and the target object.

Some operating systems provide memory pages to be marked for copy-on-write, which is similar to the idea of a versionable mapping relationship. However, these operating systems mark the base object (memory page), not the mapped object. Marking the base object means that each base object is either versionable or non-versionable. In the approach described herein, the relationship between the mapped object and the base object is versionable or non-versionable (not the base object itself). Thus multiple mapped objects may map to the same base object where one mapped object has a versionable relationship and the other has a non-versionable relationship.

Applications Benefiting from Mapped-Object Support

Many different kinds of applications can be built on top of this same object cache where the mappings are assigned rich types that direct the behavior of an operation on an object in a mapping relationship.

One application that benefits from the use of a versionable relationship is patching a running system. Previous approaches to patching a large system required downtime so that the system is not in operation while the system is updated. However, large mission critical systems cannot be taken down for as long as it may take to apply patches to many files. Another technique is to lock individual files for update, but that may result in inconsistencies in the system while the patching process is running. Starting the patch process, but delaying the acquisition of locks until the locks are needed, can lead to deadlock. Locking all files before starting essentially renders the system inoperable for its real work.

A running system is a set of objects, each with a particular version. The patch process may be lengthy and require installing new versions of many of the objects, but the system cannot be taken offline while the update takes place. The patch application can create mapped objects for all of the system objects while the running system continues to use the base objects for its operation. As files are updated to the new version, only those mapped objects that are written will be copied into a new base object, and the presence of the new object will not interfere with the running system that continues to use the original base object. Once the patch process is complete, the system can switch over to using the latest object versions.

Objects in a mapping relationship may exist across nodes in a clustered system where each node places cached objects in local memory. For example, multiple nodes may cache a mapped object to the same base object cached at a different node. As each node may support concurrent processing, each mapped object may also need mutual exclusion locking. When the first processing unit (thread) requests a shared read lock on the local mapped object, a shared read lock is first obtained on the underlying base object. Once successful, the read lock is issued on the local mapped object. A subsequent request for a shared read lock need not request a lock on the base object. Without the use of a local mapped object, all locking requests would require locking the base object on a different node.

Another application of the techniques described herein is re-implementing database synonym functionality that is used as an alias for a database table. A database synonym is created persistently and contains the link to the real database table within its content. Thus, to perform an operation on the underlying table using the synonym, the synonym object must be brought into memory to determine the underlying table, and then the underlying table must be brought into memory and accessed. Synonyms can be implemented more efficiently by creating transient mapped objects during execution (not persistently), and mapped to a base object whose contents contains the target database table. The semantics of database synonyms may be preserved by creating a non-versionable mapping. Thus, all operations performed on the synonym result in the operations being performed on the underlying table.

The example explaining semantic relationships also demonstrates the application of reusing cached query output when two queries can be verified as semantically equivalent.

Much processing time can be saved by avoiding having to re-compute the query execution plan.

Inheritance semantics can be built based on a representative, non-versionable mapping type. An inheritance relationship is one in which content in a base object is shared (inherited) by the set of mapped objects that have an inheritance relationship with the base object, and in addition, each mapped object has content of its own. FIG. 4 may also be viewed as an inheritance tree. Object Z (410) ("Z") may represent a base object from which all other objects in the hierarchy inherit basic properties. Object W (420) ("W") and Object X ("X") inherit the properties from "Z" as well as have content of their own. The data in "Z" is shared between "W" and "X" and only needs to be updated once rather than replicating updates to "W" and "X". Also, Object B ("B") and Object C ("C") each have content of their own in addition to sharing the content of "X". Thus, "Z" is only a base object, "B" and "C" are only mapped objects, and "W" and "X" are mapped objects to "Z" and are base objects to "B" and "C." For example, a database schema could be represented as a hierarchical set of cached objects with inheritance.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
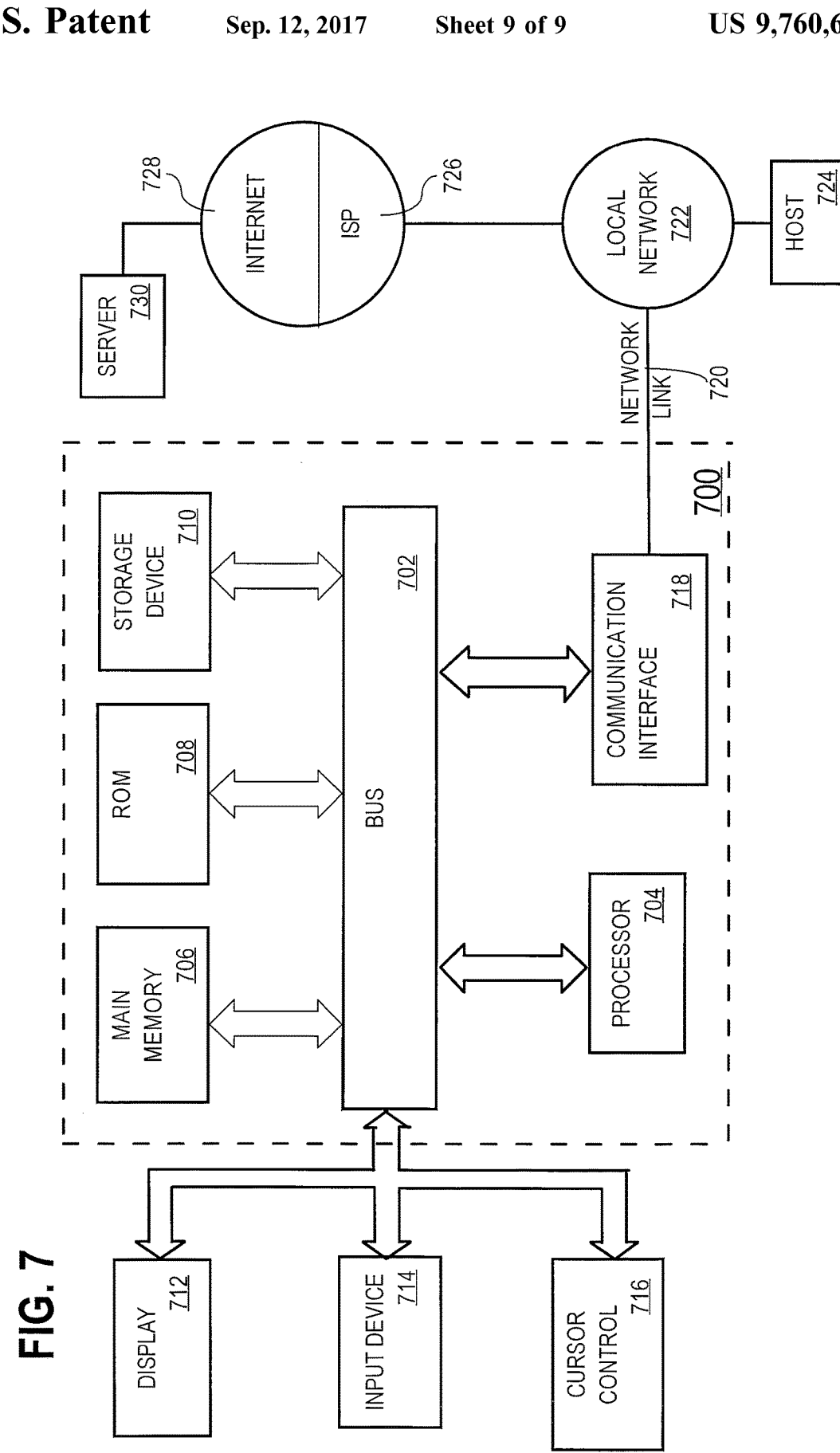
FIG. 7 is a block diagram that illustrates a computer system upon which an embodiment of the invention may be implemented according to one embodiment of the invention.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for operating on stored objects, the method comprising:
   storing a base object handle representing a base object, the base object handle comprising a base object content association that links the base object to a base object content;
   storing a mapped object handle representing a mapped object,
   the mapped object handle comprising:
      a mapping that identifies the base object handle, and
      a mutable mapping type selected from a plurality of mapping types, each of the plurality of mapping types defining semantics of one or more operations on the mapped object;
   receiving a request to perform an operation on the mapped object;
   responding to the request to perform the operation by:
      determining one or more actions to perform based on a semantic of the operation defined by the mapping type of the mapped object handle; and
      performing the one or more actions;
   wherein the mapping type is a syntactic relationship type, the mapped object handle includes a name, and the base object content includes an evaluation of a function applied to the name;
   wherein the one or more actions to perform, based on the semantics defined by the mapping type, comprises providing the base object content when the operation is a read so that the mapped object has access to the evaluation; and
   wherein the method is performed by one or more computing devices.

2. The method of claim 1, wherein the name is an expression.

3. The method of claim 2, wherein the expression is a database query expression and the evaluation is a query execution plan.

4. The method of claim 1, wherein the mapping type between the mapped object and the base object is altered while the mapped object and the base object reside in a cache.

5. The method of claim 1, wherein the mapped object resides in a first cache and the base object resides in a second cache.

6. The method of claim 1, wherein the mapped object and the base object reside in a volatile memory cache and a mapping relationship between the mapped object and the base object is stored within the mapped object handle and is retained as long as the mapped object handle resides in the volatile memory cache.

7. The method of claim 1, wherein the mapped object resides in a first volatile memory cache of a first computing node and the base object resides in a second volatile memory cache of a second computing node and a mapping relationship between the mapped object and the base object is stored within the mapped object handle and is retained as long as the mapped object handle resides in the first volatile memory cache.

8. A non-transitory computer-readable medium carrying one or more sequences of instructions for operating on stored objects, wherein execution of the one or more sequences of instructions by one or more processors causes the one or more processors to perform the steps of:
   storing a base object handle representing a base object, the base object handle comprising a base object content association that links the base object to a base object content;
   storing a mapped object handle representing a mapped object, the mapped object handle comprising:
      a mapping that identifies the base object handle, and
      a mutable mapping type selected from a plurality of mapping types, each of the plurality of mapping types defining semantics of one or more operations on the mapped object;
   receiving a request to perform an operation on the mapped object;
   responding to the request to perform the operation by:

determining one or more actions to perform based on the semantic of the operation defined by the mapping type of the mapped object handle; and performing the one or more actions;

wherein the mapping type is a syntactic relationship type, the mapped object handle includes a name, and the base object content includes an evaluation of a function applied to the name; and wherein the one or more actions to perform, based on the semantics defined by the mapping type, comprises providing the base object content when the operation is a read so that the mapped object has access to the evaluation.

9. The non-transitory computer readable medium of claim 8, wherein the name is an expression.

10. The non-transitory computer readable medium of claim 9, wherein the expression is a database query expression and the evaluation is a query execution plan.

11. The non-transitory computer readable medium of claim 8, wherein the mapped object resides in a first cache and the base object resides in a second cache.

12. The non-transitory computer readable medium of claim 8, wherein the mapped object and the base object reside in a volatile memory cache and a mapping relationship between the mapped object and the base object is stored within the mapped object handle and is retained as long as the mapped object handle resides in the volatile memory cache.

13. The non-transitory computer readable medium of claim 8, wherein the mapped object resides in a first volatile memory cache of a first computing node and the base object resides in a second volatile memory cache of a second computing node and a mapping relationship between the mapped object and the base object is stored within the mapped object handle and is retained as long as the mapped object handle resides in the first volatile memory cache.

14. A computer-implemented method for operating on stored objects, the method comprising:

storing a base object handle representing a base object, the base object handle comprising a base object content association that links the base object to a base object content;

storing a mapped object handle representing a mapped object, the mapped object handle comprising:
a mapping that identifies the base object handle, and
a mutable mapping type selected from a plurality of mapping types, each of the plurality of mapping types defining semantics of one or more operations on the mapped object;

receiving a request to perform an operation on the mapped object;

responding to the request to perform the operation by:
determining one or more actions to perform based on a semantic of the operation defined by the mapping type of the mapped object handle; and
performing the one or more actions;

wherein the mapping type is a semantic relationship type, the mapped object handle includes a name, and the base object content includes an evaluation of a function applied to the name;

wherein the evaluation of the function has an associated set of results;

wherein the one or more actions to perform, based on the semantics defined by the mapping type, comprises providing the base object content when the operation is a read so that the mapped object has access to the associated set of results; and wherein the method is performed by one or more computing devices.

15. The method of claim 14, wherein the name is an expression.

16. The method of claim 15, wherein the expression is a database query expression and the evaluation is a query execution plan.

17. The method of claim 14, wherein the mapping type between the mapped object and the base object is altered while the mapped object and the base object reside in a cache.

18. The method of claim 14, wherein the mapped object resides in a first cache and the base object resides in a second cache.

19. The method of claim 14, wherein the mapped object and the base object reside in a volatile memory cache and a mapping relationship between the mapped object and the base object is stored within the mapped object handle and is retained as long as the mapped object handle resides in the volatile memory cache.

20. The method of claim 14, wherein the mapped object resides in a first volatile memory cache of a first computing node and the base object resides in a second volatile memory cache of a second computing node and a mapping relationship between the mapped object and the base object is stored within the mapped object handle and is retained as long as the mapped object handle resides in the first volatile memory cache.

21. A non-transitory computer-readable medium carrying one or more sequences of instructions for operating on stored objects, wherein execution of the one or more sequences of instructions by one or more processors causes the one or more processors to perform the steps of:

storing a base object handle representing a base object, the base object handle comprising a base object content association that links the base object to a base object content;

storing a mapped object handle representing a mapped object, the mapped object handle comprising:
a mapping that identifies the base object handle, and
a mutable mapping type selected from a plurality of mapping types, each of the plurality of mapping types defining semantics of one or more operations on the mapped object;

receiving a request to perform an operation on the mapped object;

responding to the request to perform the operation by:
determining one or more actions to perform based on a semantic of the operation defined by the mapping type of the mapped object handle; and
performing the one or more actions;

wherein the mapping type is a sematic relationship type, the mapped object handle includes a name, and the base object content includes an evaluation of a function applied to the name;

wherein carrying out the evaluation of the function generates a set of results; and wherein the one or more actions to perform, based on the semantics defined by the mapping type, comprises providing the base object content when the operation is a read so that the mapped object has access to the set of results.

22. The non-transitory computer readable medium of claim 21, wherein the name is an expression.

23. The non-transitory computer readable medium of claim 22, wherein the expression is a database query expression and the evaluation is a query execution plan.

24. The non-transitory computer readable medium of claim 21, wherein the mapped object resides in a first cache and the base object resides in a second cache.

25. The non-transitory computer readable medium of claim 21, wherein the mapped object and the base object reside in a volatile memory cache and a mapping relationship between the mapped object and the base object is stored within the mapped object handle and is retained as long as the mapped object handle resides in the volatile memory cache.

26. The non-transitory computer readable medium of claim 21, wherein the mapped object resides in a first volatile memory cache of a first computing node and the base object resides in a second volatile memory cache of a second computing node and a mapping relationship between the mapped object and the base object is stored within the mapped object handle and is retained as long as the mapped object handle resides in the first volatile memory cache.

\* \* \* \* \*